July 8, 1947. F. G. PAXTON 2,423,724
PLANT PROPAGATING POT AND METHOD OF MAKING THE SAME
Filed Jan. 1, 1945
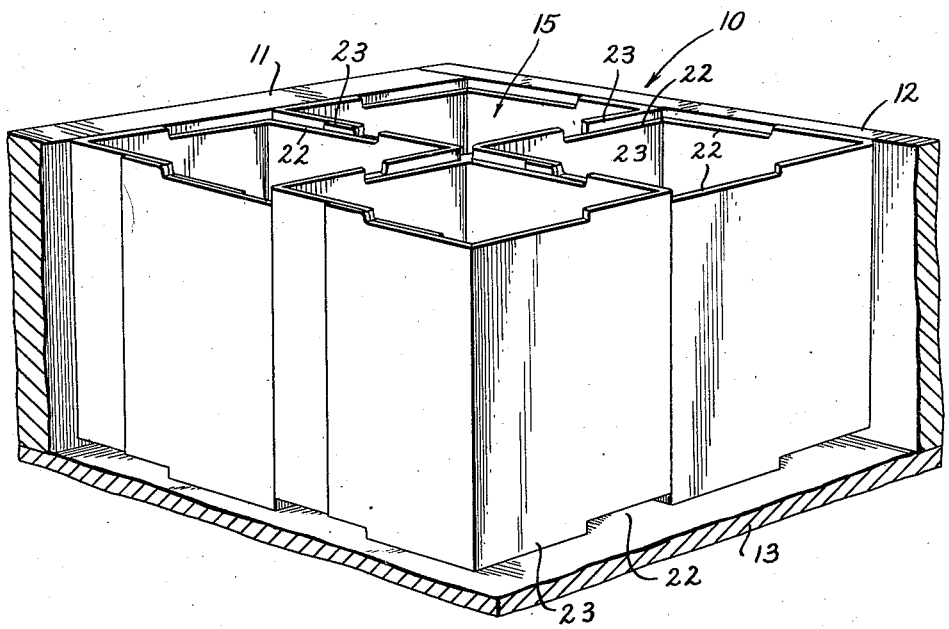
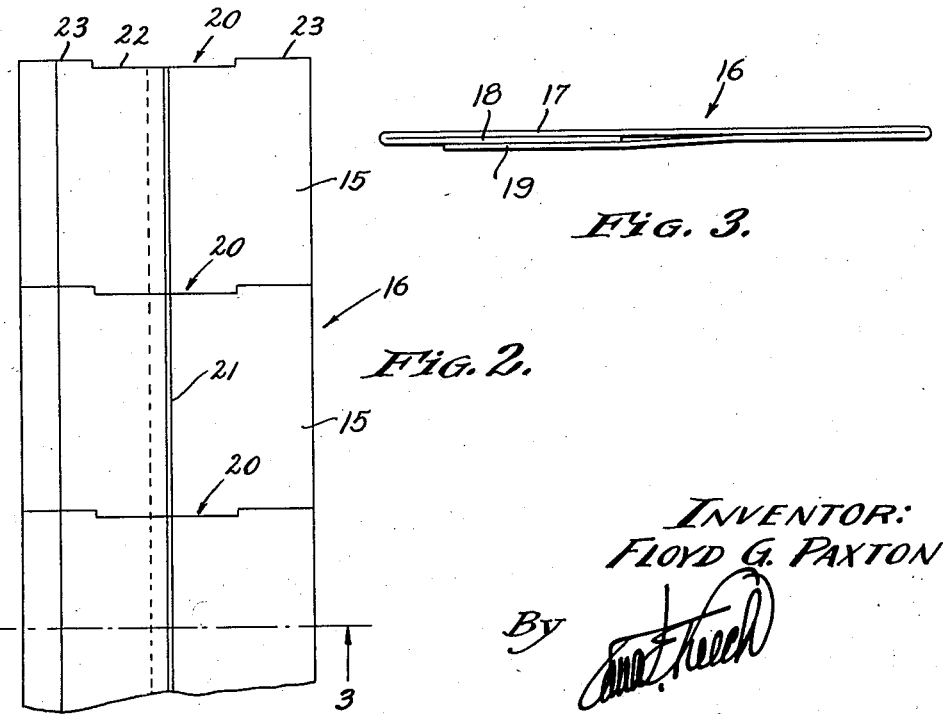
INVENTOR:
FLOYD G. PAXTON
By
Attorney Patented July 8, 1947

2,423,724

UNITED STATES PATENT OFFICE 2,423,724

PLANT PROPAGATING POT AND METHOD OF MAKING SAME

Floyd G. Paxton, Riverside, Calif.

Application January 1, 1945, Serial No. 570,837½

5 Claims. (Cl. 47—37)

This invention relates to greenhouse supplies and particularly to a novel plant propagating pot and the method of making the same.

It is standard nursery practise to transplant small seedling plants to shallow trays known as "flats" from which these plants are sold.

It is an object of this invention to provide a novel plant propagating pot which may be used to divide up the earth in a flat so that the earth around each plant may be removed with the latter relatively easily, and without breaking the earth away from the plant.

It is another object of the invention to provide such a pot which takes up very little room in the flat and which is made of an inexpensive material which is ultimately absorbed into the soil, but which temporarily retains its strength and shape to perform the functions of a plant propagating pot.

Another object of the invention is to provide such a plant propagating pot which may be made up in flat folded form and be readily expanded into proper form for use and which, when assembled with other similar pots in a flat, will provide an upwardly extending protrusion which may be used as a handle to lift this pot from among the others in the flat.

It is another object of the invention to provide a novel method of making such a plant propagating pot as will permit this to be very inexpensively produced, and which will provide drainage between the bottom of the pot and the floor of the flat.

The manner of accomplishing the foregoing objects, as well as further objects and advantages will be made manifest in the following description taken in connection with the accompanying drawing in which:

Fig. 1 is a perspective view of a corner portion of a flat containing a group of the plant propagating pots of my invention assembled in a flat, the latter being broken away to reveal the relationship of the pots when so assembled.

Fig. 2 is a plan view of a piece of flattened tubular stock illustrating the preferred mode employed in the method of my invention to produce the propagating pot thereof.

Fig. 3 is an enlarged cross-sectional view taken on line 3—3 of Fig. 2 and illustrating the manner in which the tubular stock shown in Fig. 2 is produced.

Referring specifically to the drawings, the numeral 10 designates a corner portion of a nurseryman's flat which is a shallow tray having ends 11, sides 12 and a bottom 13 which constitutes a floor for the flat.

Shown in the flat 10 is a fragmentary group of four plant propagating pots 15 which constitute preferred embodiments of the present invention. These pots are produced from a flattened tubular stock 16, preferably formed of paper.

As shown in Fig. 3, the stock 16 is produced of sheets of paper 17 having short side flaps 18 and long side flaps 19 folded from the edges of the paper 17 in overlapping relation, and pressed together with an adhesive therebetween.

The paper 17 is of various weights depending upon the degree of durability which it is desired that the pot 15 have. This paper is also preferably impregnated with asphalt to make it resistant to water and attacks of insects for a limited period of time.

Having been thus made up, the flattened tubular stock 16 is fed through a suitable cutting machine which severs sections from the leading end of the stock as it is fed to the cutter.

In Fig. 2 the numeral 20 designates the lines on which the cutter severs the stock 16 to produce plant propagating pots 15. As the stock 16 is fed to the cutter, it is creased centrally as indicated at 21, so that the individual pots 15 may be readily unfolded from flat condition to form square pots as shown in Fig. 1.

When the pots are thus unfolded, the character of the lines 20 causes recesses 22 and protrusions 23 to appear at the corners, both at the bottom and top of each pot. At the bottom the protrusions 23 form legs which support the pot on the flat floor 13, while the recesses 22 provide drainage openings through which water may drain from the soil in the pot.

When the pots are assembled side by side in uniform order relative to each other within a flat as shown in Fig. 1, the protrusions 23 of each pot at the upper end thereof come opposite upper recesses 22 of adjacent pots. The pots 15 are so dimensioned, of course, as to just fill the tray 10, and the protrusions 23 thus provide very convenient handles by which individual pots within the tray may be lifted upwardly when a customer elects to purchase the plants contained within such pots.

The earth in all the pots 15 is packed down when the planting in the flat is made. Thus when any pot is removed individually the earth in that pot remains in place about the roots of the plant therein in spite of the fact that the pots 15 are bottomless.

From the foregoing it is seen that I have provided a novel paper plant propagating pot having numerous advantages and a method of production making these pots very inexpensive.

While I have shown and described but a single preferred embodiment of the propagating pot of my invention, and a single method of producing the same, it is to be understood that various changes may be made in these without departing from the spirit of the invention or the scope of the appended claims.

I claim:

1. A paper plant propagating pot comprising a square paper tube having castellated upper and lower edges exhibiting alternate protrusions and recesses, the protrusions of said bottom edge providing balanced supporting feet for said pot, the recesses of said bottom edge providing drainage from said pot, a protrusion of said upper edge on a given side of the pot being adapted to lie opposite and extend above a recess of the upper edge of another such pot placed in side by side relation therewith.

2. A pot as defined in claim 1 in which the recesses in the bottom edge are coextensive with the protrusions in the upper edge, and the protrusions in the bottom edge are coextensive with the recesses in the upper edge.

3. A pot as defined in claim 1 in which recesses occupy diagonally opposite corners of the upper edge, and protrusions the other corners of said upper edge.

4. A pot as defined in claim 1 in which recesses occupy diagonally opposite corners of the upper edge, and protrusions the other corners of said upper edge and in which the same is true of the lower edge excepting that lower edge recesses are on the same corners as upper edge protrusions, and lower edge protrusions are on the same corners as upper edge recesses.

5. A paper plant propagating pot comprising a paper tube, the upper and lower edges of which exhibit alternate vertically protruding portions and recesses, the protruding portions of the bottom edge providing support for said pot, the recesses of said bottom edge providing drainage from said pot, a protrusion of said upper edge on a given side of said pot being adapted to lie opposite and extend above a recess of the upper edge of another such pot placed in side by side relation therewith.

FLOYD G. PAXTON.

REFERENCES CITED

The following references are of record in the file of this patent:

UNITED STATES PATENTS

| Number | Name | Date |
|---|---|---|
| 2,006,822 | Andrews | July 2, 1935 |
| 1,566,077 | Davidson | Dec. 15, 1925 |
| 1,767,629 | Walter | June 24, 1930 |
| 1,684,458 | Smith | Sept. 18, 1928 |
| 2,247,341 | Anderson | June 24, 1941 |
| 894,211 | Kaump | July 28, 1908 |

OTHER REFERENCES

"Paper Golf Tees by the Strip," Popular Mechanics Sept. 1939. (Copy located in Division 40.)